United States Patent
Lee et al.

(10) Patent No.: US 8,385,301 B2
(45) Date of Patent: Feb. 26, 2013

(54) APPARATUS AND METHOD FOR INCREASING OPERATION TIME IN IEEE802.15.4-2006 BEACON BASED WIRELESS SENSOR NETWORK

(75) Inventors: Jong Oh Lee, Daejeon (KR); Nae Soo Kim, Daejeon (KR); Cheol Sig Pyo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 630 days.

(21) Appl. No.: 12/619,815

(22) Filed: Nov. 17, 2009

(65) Prior Publication Data

US 2010/0128706 A1  May 27, 2010

(30) Foreign Application Priority Data

Nov. 25, 2008  (KR) .................. 10-2008-0117479

(51) Int. Cl.
*H04Q 7/24* (2006.01)

(52) U.S. Cl. ........................................ 370/338
(58) Field of Classification Search .............. None
See application file for complete search history.

(56) References Cited

U.S. PATENT DOCUMENTS

| | | | |
|---|---|---|---|
| 2004/0117497 A1* | 6/2004 | Park ....................... | 709/230 |
| 2009/0323667 A1* | 12/2009 | Doi et al. ................ | 370/349 |
| 2010/0202349 A1* | 8/2010 | Guan ...................... | 370/328 |

FOREIGN PATENT DOCUMENTS

| KR | 10-2007-0106097 | 11/2007 |
|---|---|---|
| KR | 10-2008-0050966 | 6/2008 |

* cited by examiner

*Primary Examiner* — Hassan Phillips
*Assistant Examiner* — Prenell Jones
(74) *Attorney, Agent, or Firm* — Staas & Halsey LLP (57) ABSTRACT

Provided are an apparatus and method for increasing operation time in an IEEE802.15.4-2006 beacon based wireless sensor network (WSN) with respect to the same amount of power consumption used by coordinators included in a WSN, by reducing unnecessary standby power consumption required during an active period of a super frame in a beacon-enabled mode.

19 Claims, 7 Drawing Sheets

| Octets:2 | 1 | 4 or 10 | 2 | variable | variable | variable | 2 |
|---|---|---|---|---|---|---|---|
| Frame Control | Sequence Number | Addressing Fields | Superframe Specification | GTS variable | Pending Address Fields (400) | Beacon Payload | FCS |
| MCR | | | MAC Payload | | | | MCR |

APPARATUS AND METHOD FOR INCREASING OPERATION TIME IN IEEE802.15.4-2006 BEACON BASED WIRELESS SENSOR NETWORK

CROSS-REFERENCE TO RELATED PATENT APPLICATION

This application claims the benefit of Korean Patent Application No. 10-2008-0117479, filed on Nov. 25, 2008, in the Korean Intellectual Property Office, the disclosure of which is incorporated herein in its entirety by reference.

BACKGROUND OF THE INVENTION

1. Field of the Invention

The present invention relates to an apparatus and method for increasing operation time in an IEEE802.15.4-2006 beacon based wireless sensor network (WSN), and more particularly to, an apparatus and method for increasing operation time with respect to the same amount of power consumption used by coordinators included in a WSN by reducing unnecessary standby power consumption required during an active period of a super frame.

2. Description of the Related Art

A wireless sensor network (WSN) uses a plurality of sensor nodes including a sensor that detects recognition information about an object or information about surroundings.

The WSN is a network system that connects to an external network in real time, processes information input through various sensors, and manages the information.

The WSN provides computing and communication functions, so as to realize a communication environment any time and anywhere irrespective of types of networks, devices, or services.

Figure 1:
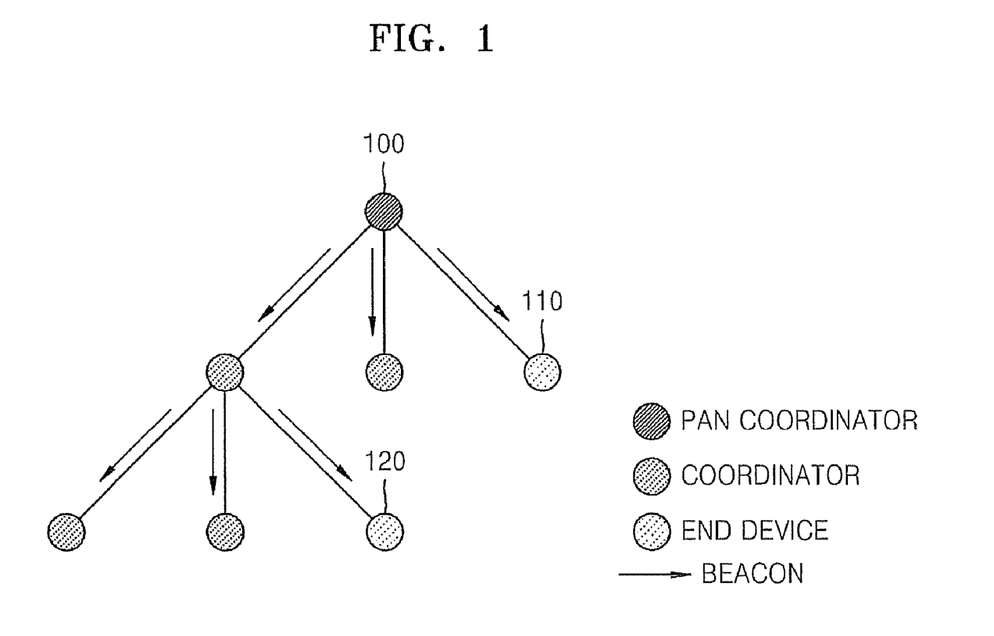
FIG. 1 illustrates a conventional IEEE802.15.4-2006 beacon based tree network that is a wireless sensor network (WSN) system.

FIG. 1 illustrates a conventional IEEE802.15.4-2006 beacon based tree network that is a WSN system.

The IEEE802.15.4 standard concerns a physical layer and a data link layer of a lower rate wireless personal area network (WPAN).

The IEEE802.15.4 standard is a protocol that is directed toward a low rate communication bandwidth and low power, which is suitable for a device in a WPAN having a relatively short transmission distance and for realizing the WSN system.

The IEEE802.15.4-2006 standard has been revised to separate an active period of a super frame into a receiving region and a transmission region in order to prevent beacon collisions of coordinators, which is a problem of the IEEE802.15.4 standard.

Coordinators of an IEEE802.15.4-2006 beacon based WSN use a super frame structure to perform data communication.

Referring to FIG. 1, the super frame is managed by a PAN coordinator 100 and its range is determined according to a beacon frame transmitted by the PAN coordinator 100 every designated interval.

Each beacon frame includes network synchronization information of a plurality of network coordinators 110.

The network synchronization information includes a network address of a coordinator that is to receive data, a beacon order (BO) that determines a beacon interval (BI), and a super frame order (SO) that determines a super frame duration (SD) that is a super frame active period.

Figure 2:
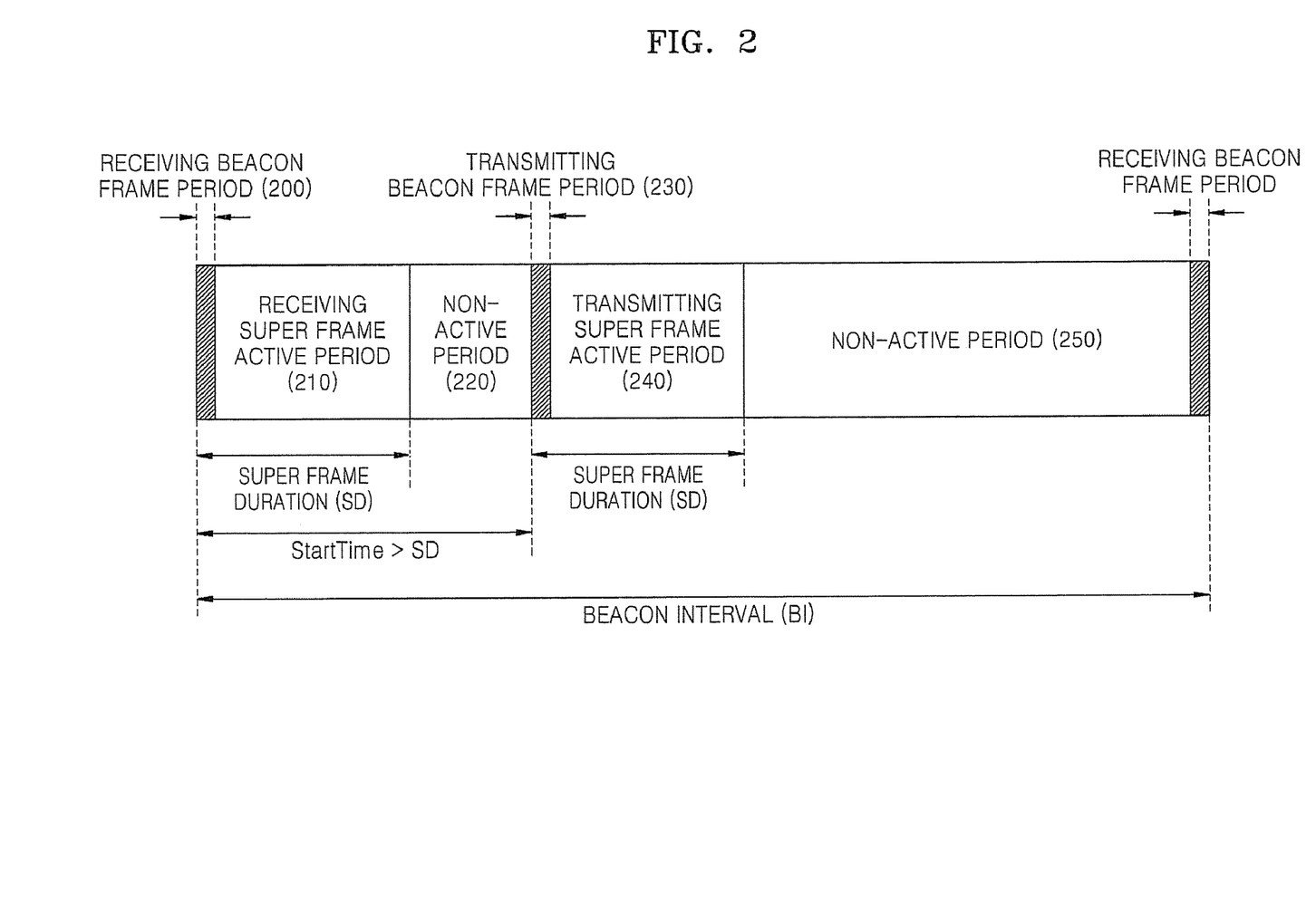
FIG. 2 illustrates a conventional super frame structure under the IEEE802.15.4-2006 standard.

FIG. 2 illustrates a conventional super frame structure under the IEEE802.15.4-2006 standard. Referring to FIG. 2, the super frame structure includes two beacon frame periods 200 and 230, two active periods 210 and 240, and two non-active periods 220 and 250.

The beacon frame periods 200 and 230 include the beacon frame period 200 and the transmission beacon frame period 230.

The active periods 210 and 240 include the receiving super frame period 210 and the transmission super frame period 240 according to the receipt of a beacon and according to a transmission region.

The non-active periods 220 and 250 include the transmission period 220 and the receiving period 250.

Each coordinator uses the super frame structure to change a mode into a sleep mode during the non-active periods 220 and 250, thereby minimizing power consumption.

An SD and a BI are determined according to an SO value and a BO value, respectively. The SD and the BI are expressed according to equations 1 and 2 below, $$SD = \text{basic } SD * 2^{SO} \text{ symbols} \quad (1)$$

$$BI = \text{basic } SD * 2^{BO} \text{ symbols} \quad (2)$$

wherein, the SO is greater than or equal to 0 and is smaller than or equal to the BO, and BO is greater than or equal to 0 and is smaller than or equal to 14.

If a minimum SD under the IEEE802.15.4 standard operating at 2.4 GHz is calculated by using equation 1, when SO=0, the minimum SD=15.36 msec.

Therefore, a coordinator following the conventional super frame structure under the IEEE802.15.4-2006 standard must maintain minimum transmission and receiving SDs and transmission and receiving super frame active periods 2*SD=30.72 msec when the coordinator does not receive data from an upper parent coordinator or a lower child coordinator.

The minimum transmission and receiving SDs increase when the SO value increases.

When the coordinator does not receive data from the upper parent coordinator or the lower child coordinator, the coordinator following the conventional super frame structure under the IEEE802.15.4-2006 standard is in a receiving standby state during the active periods, causing unnecessary standby power consumption.

SUMMARY OF THE INVENTION

The present invention provides an apparatus and method for increasing operation time in a wireless sensor network (WSN) that maximizes the lifetime of a plurality of coordinators joining the WSN by maintaining a minimum duration of transmission and receiving super frame active periods if no data is received from an upper parent coordinator or a lower child coordinator.

The present invention also provides a method of determining whether a coordinator that transmits and receives a beacon frame receives data from an upper parent coordinator or a lower child coordinator, and a super frame structure that adjusts a duration of transmission and receiving super frame active periods by using the method.

According to an aspect of the present invention, there is provided a method of increasing operation time in an IEEE802.15.4-2006 beacon based wireless sensor network (WSN), the method includes receiving a beacon frame from an upper parent coordinator; comparing a network address included in a region of the beacon frame with a network address of a coordinator; and if the network address included in the region of the beacon frame is the same as the network address of the coordinator, the coordinator receiving the data from the upper parent coordinator during the receiving super frame active period and changing a receiving super frame active period to a receiving super frame non-active period, and, if the network address included in the region of the beacon frame is not the same as the network address of the coordinator, the coordinator not receiving the data from the upper parent coordinator during the receiving super frame active period, and changing from the receiving super frame active period to the receiving super frame non-active period.

The receiving super frame active period, if the network address included in the region of the beacon frame is the same as the network address of the coordinator, may be greater than the receiving super frame active period if the network address included in the region of the beacon frame is not the same as the network address of the coordinator.

The network address included in the beacon frame may be included in a pending address region of the beacon frame.

According to another aspect of the present invention, there is provided a method of increasing operation time in an IEEE802.15.4-2006 beacon based WSN, the method includes: initializing a maximum receiving standby time to receive data from a lower child coordinator; maintaining a transmission super frame active period to receive the data from the lower child coordinator; and if the data is received from the lower child coordinator, receiving the data and reinitializing the maximum receiving standby time, and, if the data is not received from the lower child coordinator and a data receiving standby time exceeds the maximum receiving standby time, changing the transmission super frame active period to a transmission super frame non-active period.

The method may further include: transmitting a beacon frame to the lower child coordinator.

The initializing of the maximum receiving standby time may include: determining the maximum receiving standby time according to an equation of maximum receiving standby time=basic back-off duration*$(2^{BE(max)}-1)$ symbols, based on a slotted carrier sense multiple access-collision avoidance (CSMA-CA) algorithm under the IEEE802.15.4 standard, and BE(max) denotes a maximum value of a back-off exponent.

A network address of the lower child coordinator may be included in a region of the beacon frame.

According to another aspect of the present invention, there is provided an apparatus for increasing operation time in an IEEE802.15.4-2006 beacon based WSN, the apparatus includes: a receiving unit determining whether to receive data from an upper parent coordinator based on a result obtained by comparing a network address included in a region of a beacon frame received from the upper parent coordinator with a network address of a coordinator, and changing from a receiving super frame active period to a receiving super frame non-active period after receiving the data; and a transmitting unit initializing a maximum receiving standby time if the data is received from a lower child coordinator, maintaining a transmission super frame active period, and, if the data is not received from the lower child coordinator and a data receiving standby time exceeds the maximum receiving standby time, changing the transmission super frame active period to a transmission super frame non-active period.

The receiving unit may include: a beacon frame receiving unit receiving a beacon frame from the upper parent coordinator; a network address comparing unit comparing the network address included in the region of the beacon frame with the network address of the coordinator; and a mode changing unit, if the network address included in the region of the beacon frame is the same as the network address of the coordinator, changing the receiving super frame active period to the receiving super frame non-active period after the coordinator receives the data from the upper parent coordinator during the receiving super frame active period, and, if the network address included in the region of the beacon frame is not the same as the network address of the coordinator, changing the receiving super frame active period to the receiving super frame non-active period, and the coordinator not receiving the data from the upper parent coordinator during the receiving super frame active period.

The transmitting unit may include: a maximum receiving standby time initializing unit initializing the maximum receiving standby time to receive the data from the lower child coordinator; a data receiving unit maintaining the transmission super frame active period during the maximum receiving standby time and receiving the data from the lower child coordinator during the transmission super frame active period; and a mode changing unit reinitializing the maximum receiving standby time if the data is received from the lower child coordinator, and, if the data is not received from the lower child coordinator and the data receiving standby time exceeds the maximum receiving standby time, changing the transmission super frame active period to the transmission super frame non-active period.

The receiving super frame active period, if the network address included in the region of the beacon frame is the same as the network address of the coordinator, may be greater than the receiving super frame active period if the network address included in the region of the beacon frame is not the same as the network address of the coordinator.

The network address included in the beacon frame may be included in a pending address region of the beacon frame.

The method may further include: a beacon frame transmitting unit transmitting a beacon frame to the lower child coordinator.

The maximum receiving standby time initializing unit may determine the maximum receiving standby time according to an equation of maximum receiving standby time=basic back-off duration*$(2^{BE(max)}-1)$ symbols, based on a slotted CSMA-CA algorithm under the IEEE802.15.4 standard, and BE(max) denotes a maximum value of a back-off exponent.

A network address of the lower child coordinator may be included in a region of the beacon frame.

According to another aspect of the present invention, there is provided a computer readable recording medium storing a program for executing a super frame in an IEEE802.15.4-2006 beacon based WSN, wherein the super frame includes: a receiving beacon frame period receiving a beacon frame from an upper parent coordinator; a receiving super frame active period determining whether to receive data from the upper parent coordinator based on a result obtained by comparing a network address included in a region of the beacon frame with a network address of a coordinator, and adjusting duration of an operation period of the coordinator according to an amount of the data; a receiving super frame non-active period completely receiving the data and maintaining power consumption of the coordinator as a standby state; a transmitting beacon frame period transmitting the beacon frame to a lower child coordinator; a transmitting super frame active period maintaining the operation state of the coordinator during a maximum receiving standby time to receive the data from the lower child coordinator; and a transmitting super frame non-active period maintaining the power consumption of the coordinator as the standby state, wherein maximum receiving standby time initializing unit determines the maximum receiving standby time according to an equation of maximum receiving standby time=basic back-off duration*($2^{BE(max)}$−1) symbols, based on a slotted CSMA-CA algorithm under the IEEE802.15.4 standard, and BE(max) denotes a maximum value of a back-off exponent.

The duration of the receiving beacon frame period, the receiving super frame active period, and the receiving super frame non-active period may be the same as a super frame duration (SD), wherein SD=basic SD*$2^{SO}$ symbols, the SO is greater than or equal to 0 and is smaller than or equal to the BO, and BO is greater than or equal to 0 and is smaller than or equal to 14.

The duration of the transmitting beacon frame period, the transmitting super frame active period, and the transmitting super frame non-active period may be the same as the SD, wherein SD=basic SD*$2^{SO}$ symbols, the SO is greater than or equal to 0 and is smaller than or equal to the BO, and BO is greater than or equal to 0 and is smaller than or equal to 14.

The computer readable recording medium may further include: a non-active period in which no data is received from the upper parent coordinator or from the lower child coordinator.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 3:
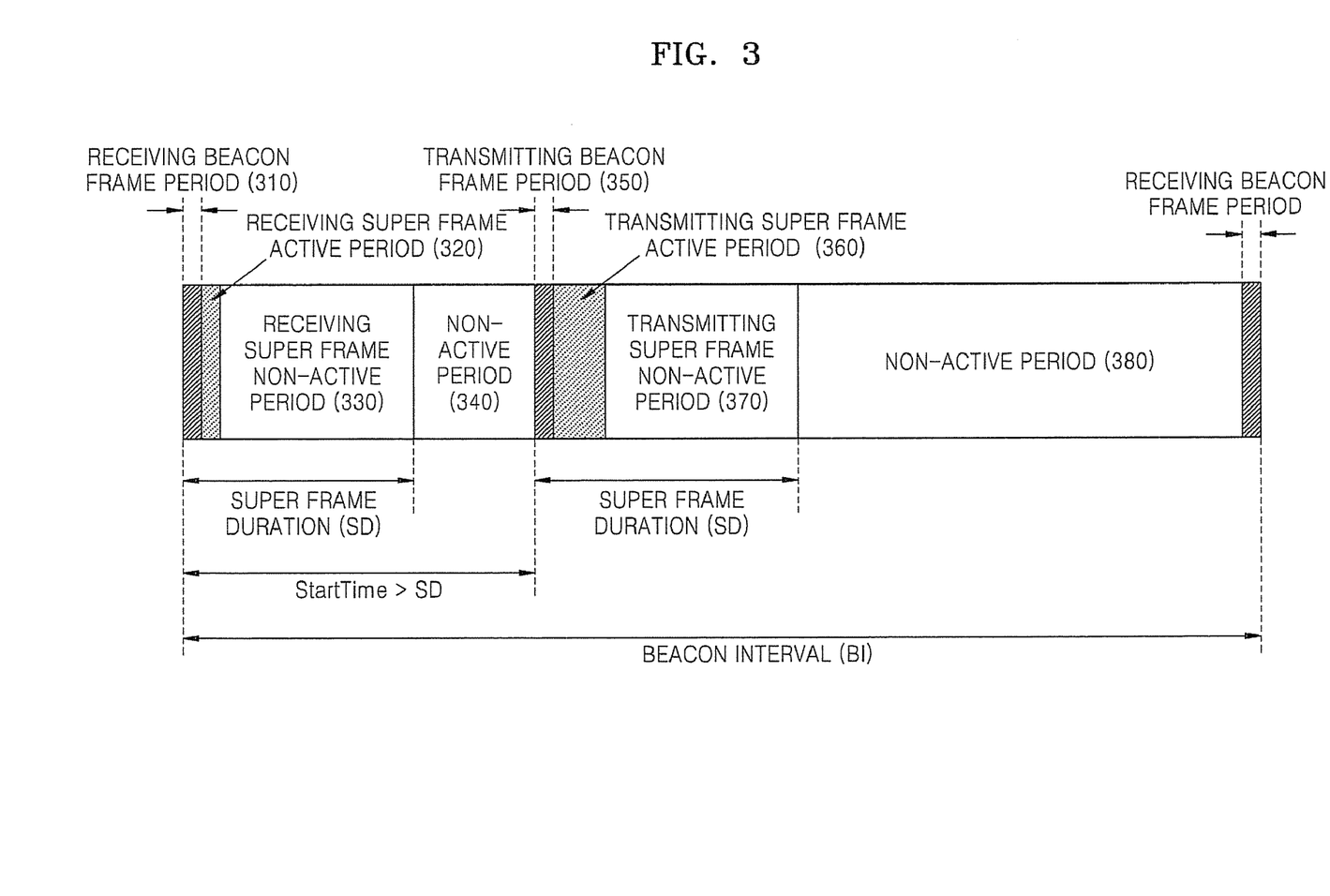
FIG. 3 illustrates a super frame structure used in an IEEE802.15.4-2006 low rate wireless personal area network (WPAN) according to an embodiment of the present invention.

FIG. 3 illustrates a super frame structure used in an IEEE802.15.4-2006 low rate wireless personal area network (WPAN) according to an embodiment of the present invention. Referring to FIG. 3, the super frame structure of the present embodiment includes a receiving beacon frame period 310, a receiving super frame active period 320, a receiving super frame non-active period 330, a transmission beacon frame period 350, a transmission super frame active period 360, a transmission super frame non-active period 370, and two non-active periods 340 and 380.

A beacon interval (BI) of a super frame and super frame duration (SD) of the present embodiment can be achieved according to the above equations 1 and 2.

The super frame structure is divided into the active periods 320 and 360 and the non-active periods 330, 340, and 370, and 380 so as to increase the whole operation time of the coordinator by minimizing power consumption required for an operation of a coordinator.

That is, the more non-active periods there are, compared to the active periods, the longer the operation time of a whole sensor network.

The active periods are divided into the receiving super frame active period 320 and the transmission super frame active period 360 in such a manner that the coordinator can communicate with an upper parent coordinator or a lower child coordinator without the occurrence of beacon collisions with surrounding coordinators.

The transmission and receiving super frame periods are divided into the receiving super frame active period 320 and the transmission super frame active period 360 and the receiving super frame non-active period 330 and the transmission super frame non-active period 370 in order to adjust a duration of the super frame active periods according to whether the coordinator receives data from the upper parent coordinator or the lower child coordinator, and to increase the whole operation time of the coordinator by maintaining the minimum duration of the super frame active periods.

In the WSN system, coordinators including a sensor node inadvertently communicate data.

Therefore, the coordinators do not perform any operations involving communicating data during the super frame periods including the non-active periods.

When the coordinators do not perform any operations involving communicating data, the coordinators no longer remain in a receiving standby state during the super frame periods and turn power off, thereby reducing a duration of the active periods, changing the active periods into the non-active periods, minimizing the receiving standby power consumption, and increasing the operation time of the coordinators.

Figure 4:
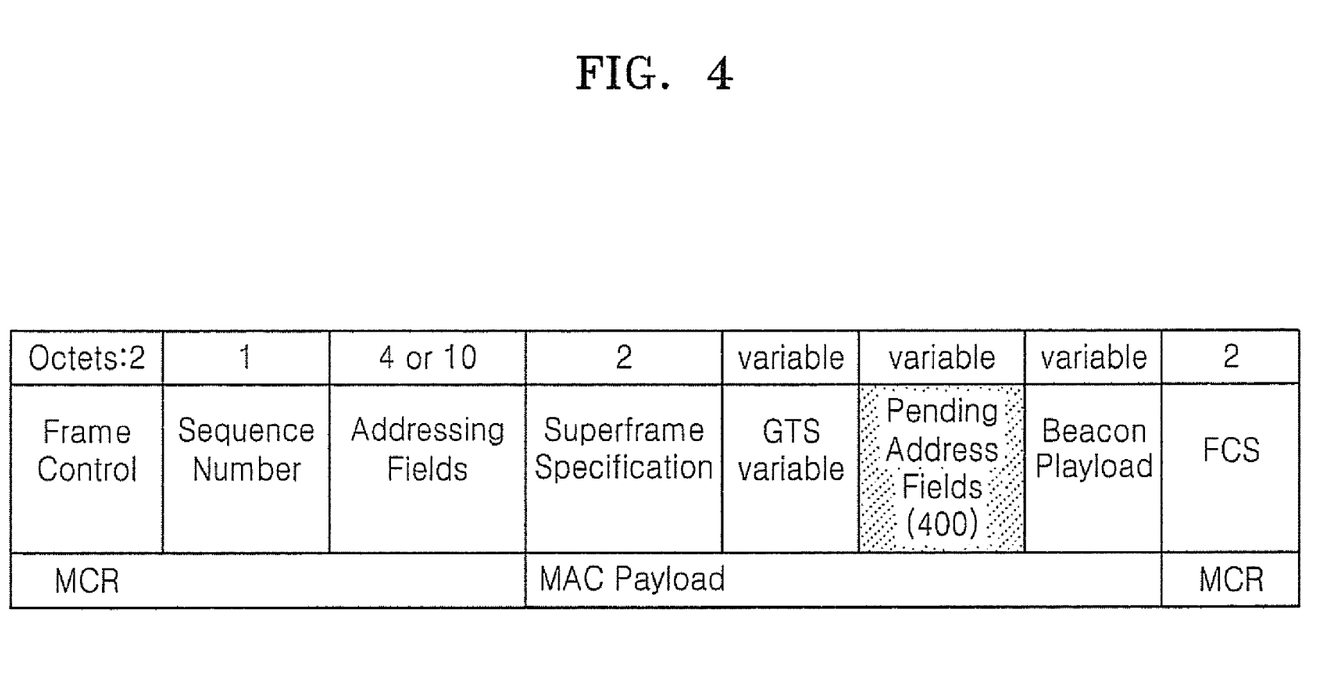
FIG. 4 illustrates a structure of a beacon frame used to determine whether data is transmitted in a method of increasing operation time in a WSN according to an embodiment of the present invention.

FIG. 4 illustrates a structure of a beacon frame used to determine whether data is transmitted in a method of increasing operation time in a WSN according to an embodiment of the present invention. Referring to FIG. 4, an upper parent coordinator sends a network address of a coordinator to a pending address 400 shown in FIG. 4 if the data is transmitted.

Figure 5:
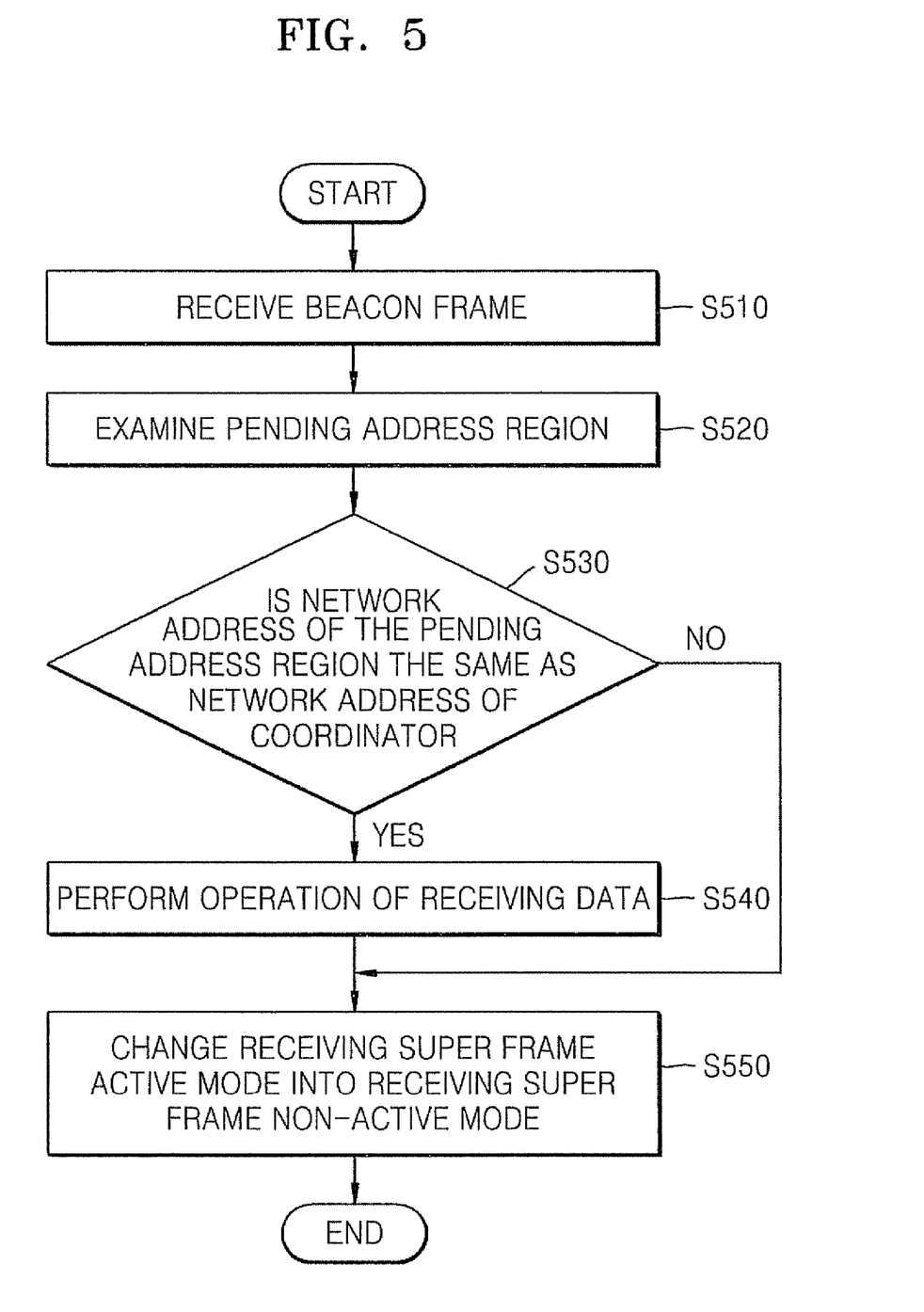
FIG. 5 is a flowchart illustrating an operation of a coordinator during a receiving super frame period in an apparatus for increasing operation time in a WSN according to an embodiment of the present invention.

FIG. 5 is a flowchart illustrating an operation of a coordinator during a receiving super frame period in an apparatus for increasing operation time in a WSN according to an embodiment of the present invention. Referring to FIG. 5, an upper parent coordinator sends a network address of the coordinator to the pending address 400 shown in FIG. 4 if data is transmitted, and the coordinator receives a beacon from the upper parent coordinator during the receiving beacon frame period 310 shown in FIG. 3 (operation 510).

The coordinator examines a pending address region of the beacon received from the upper parent coordinator (operation 520), and determines whether a network address of the pending address region is the same as the network address of the coordinator (operation 530).

If the address of the pending address region is the same as the network address of the coordinator, the coordinator receives the data during the receiving super frame active period 320 shown in FIG. 3 (operation 540), and changes to a super frame non-active period (operation 550).

Meanwhile, if the address of the pending address region is not the same as the network address of the coordinator, the coordinator changes the receiving super frame active period 320 to the super frame non-active period 330 shown in FIG. 3 (operation 550).

Figure 6:
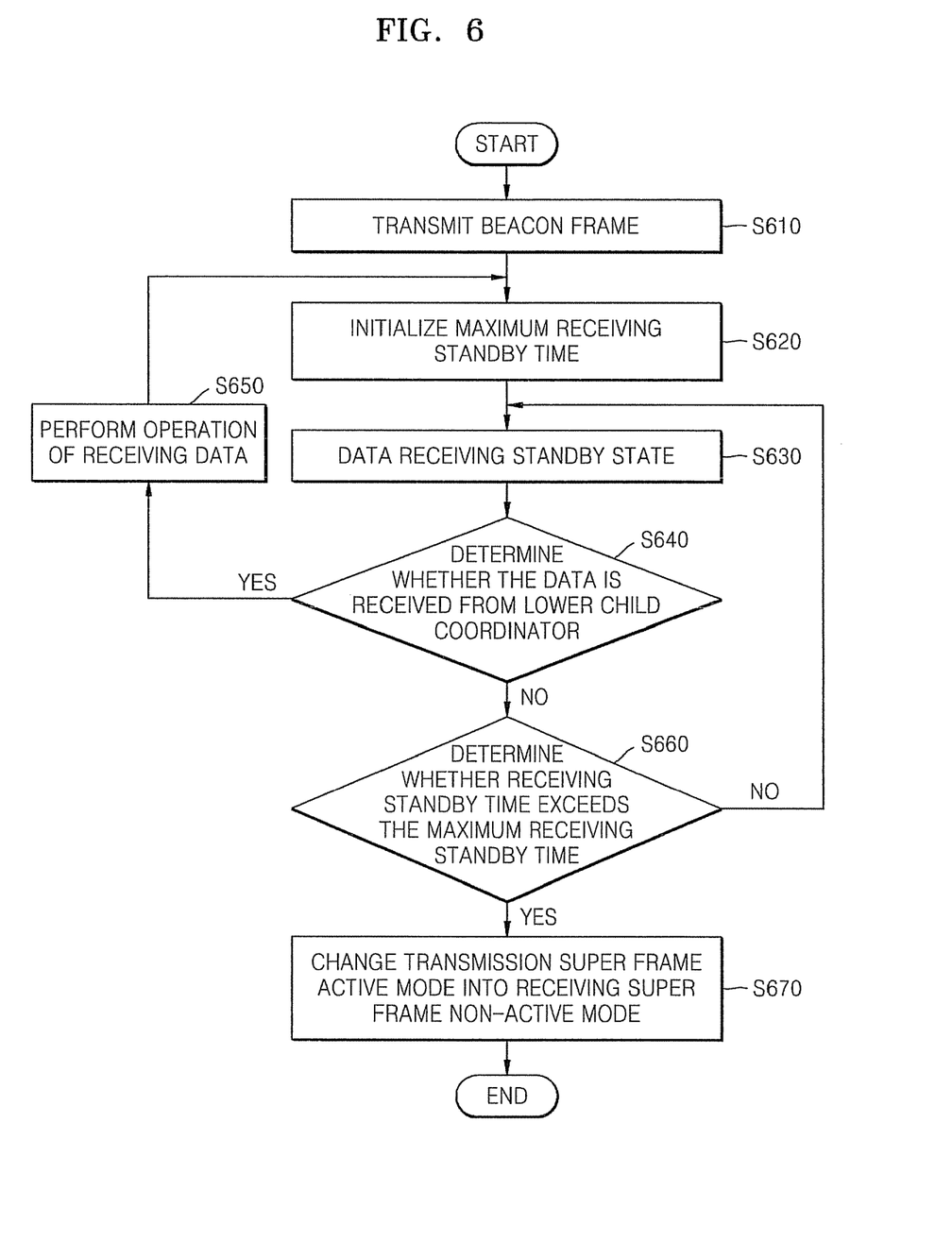
FIG. 6 is a flowchart illustrating an operation of a coordinator during a receiving super frame period in an apparatus for increasing operation time in a WSN according to another embodiment of the present invention.

FIG. 6 is a flowchart illustrating an operation of a coordinator during a receiving super frame period in an apparatus for increasing operation time in a WSN according to another embodiment of the present invention. Referring to FIG. 6, if the coordinator transmits data to a lower child coordinator during the transmission beacon frame period 350 shown in FIG. 3, the coordinator sends a network address of the lower child coordinator to a pending address region of a transmission beacon frame (operation 610).

The coordinator initializes a maximum receiving standby time to receive the data from the lower child coordinator (operation 620).

The coordinator stands ready to receive the data from the lower child coordinator during the transmission super frame active period 360 shown in FIG. 3 (operation 630).

The coordinator determines whether the data is received from the lower child coordinator (operation 640).

The coordinator performs an operation for receiving the data if the data is received from the lower child coordinator (operation 650).

The coordinator performs operation 620 again.

If the data is not received from the lower child coordinator, the coordinator determines whether receiving standby time exceeds the maximum receiving standby time (operation 660).

If the data is not received from the lower child coordinator, and the receiving standby time exceeds the maximum receiving standby time, the coordinator changes from the receiving super frame active period 360 to the transmission super frame non-active period 370 (operation 670).

If the data is not received from the lower child coordinator, and the receiving standby time does not exceed the maximum receiving standby time, the coordinator remains in a data receiving standby state until the receiving standby time exceeds the maximum receiving standby time in operation 630.

The maximum receiving standby time is determined according to a slotted carrier sense multiple access-collision avoidance (CSMA-CA) algorithm under the IEEE802.15.4 standard as shown in equation 3 below, $$\text{maximum receiving standby time} = \text{basic back-off duration} * (2^{BE(max)} - 1) \text{ symbols} \quad (3)$$

wherein, a basic back-off duration is 20 symbols, and since a maximum value of a back-off exponent (BE) is 5, the maximum receiving standby time is 620 symbols.

The maximum receiving standby time is 9.992 msec at 2.4 GHz.

Figure 7:
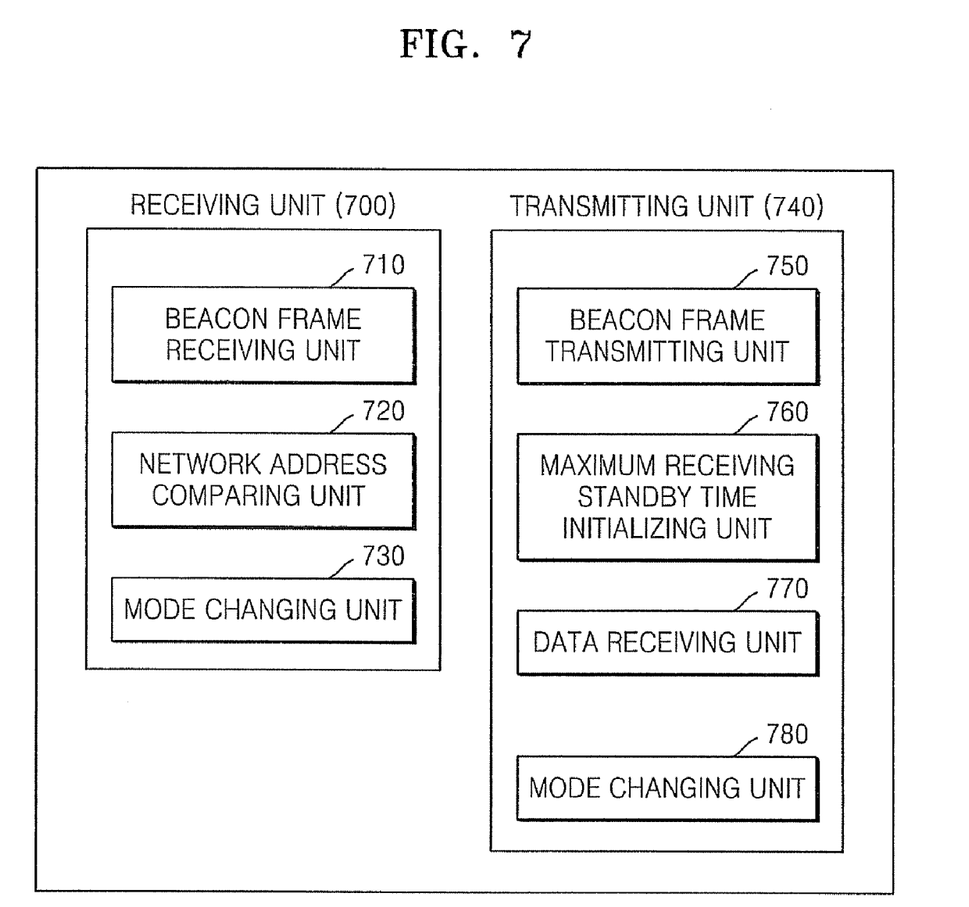
FIG. 7 is a block diagram of an apparatus for increasing operation time in a WSN according to an embodiment of the present invention.

FIG. 7 is a block diagram of an apparatus for increasing operation time in a WSN according to an embodiment of the present invention. Referring to FIG. 7, a receiving unit 700 determines whether to receive data from an upper parent coordinator based on a result obtained by comparing a network address included in a region of a beacon frame received from the upper parent coordinator with a network address of a coordinator, and changes from a receiving super frame active period to a receiving super frame non-active period after receiving the data.

The receiving unit 700 includes a beacon frame receiving unit 701, a network address comparing unit 720, and a mode changing unit 730.

The beacon frame receiving unit 710 receives a beacon frame from the upper parent coordinator.

The network address comparing unit 720 compares the network address included in the region of the beacon frame received from the upper parent coordinator with the network address of the coordinator.

The network address included in the beacon frame is included in a pending address region of the beacon frame.

If the network address included in the region of the beacon frame is the same as the network address of the coordinator, the mode changing unit 730 changes the receiving super frame active period to the receiving super frame non-active period after the coordinator receives the data from the upper parent coordinator during the receiving super frame active period. If the network address included in the region of the beacon frame is not the same as the network address of the coordinator, the coordinator does not receive the data from the upper parent coordinator during the receiving super frame active period, and the mode changing unit 730 changes the receiving super frame active period to the receiving super frame non-active period.

The receiving super frame active period, if the network address included in the region of the beacon frame is the same as the network address of the coordinator, is greater than the receiving super frame active period if the network address included in the region of the beacon frame is not the same as the network address of the coordinator.

That is, the method and apparatus for increasing operation time in the WSN according to the present embodiment can adjust the duration of the receiving super frame active period according to whether the coordinator receives the data from the upper parent coordinator.

A transmitting unit 740 initializes a maximum receiving standby time if the data is received from a lower child coordinator, maintains a transmission super frame active period, and, if the data is not received from the lower child coordinator and the data receiving standby time exceeds the maximum receiving standby time, changes the transmission super frame active period into a transmission super frame non-active period.

The transmitting unit 740 includes a beacon frame transmitting unit 750, a maximum receiving standby time initializing unit 760, a data receiving unit 770, and a mode changing unit 780.

The beacon frame transmitting unit 750 transmits a beacon frame to the lower child coordinator.

The maximum receiving standby time initializing unit 760 initializes the maximum receiving standby time to receive the data from the lower child coordinator.

The data receiving unit 770 receives the data from the lower child coordinator during the transmission super frame active period.

The mode changing unit 780 reinitializes the maximum receiving standby time if the data is received from the lower child coordinator, and, if the data is not received from the lower child coordinator and the data receiving standby time exceeds the maximum receiving standby time, changes the transmission super frame active period to the transmission super frame non-active period.

A method and apparatus for increasing operation time in a WSN according to the present invention uses an IEEE802.15.4-2006 beacon based super frame structure that can adjust a duration of a super frame active period, unlike a conventional fixed super frame period in a WSN system that uses an IEEE802.15.4-2006 low rate WPAN, and a data communication method using the IEEE802.15.4-2006 beacon based super frame structure.

The method and apparatus for increasing operation time in the WSN according to the present invention can achieve an increase in the operation time compared to a conventional method of increasing the lifetime of the WSN by adjusting a duration of a conventional active period, and can increase the whole operation time of the WSN system with respect to the same amount of power consumption.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of increasing operation time in an IEEE802.15.4-2006 beacon based wireless sensor network (WSN), the method comprising:
   receiving a beacon frame from an upper parent coordinator;
   comparing a network address included in a region of the beacon frame with a network address of a coordinator; and
   if the network address included in the region of the beacon frame is the same as the network address of the coordinator, the coordinator receiving the data from the upper parent coordinator during the receiving super frame active period and changing a receiving super frame active period to a receiving super frame non-active period, and, if the network address included in the region of the beacon frame is not the same as the network address of the coordinator, the coordinator does not receive the data from the upper parent coordinator during the receiving super frame active period, and changing from the receiving super frame active period to the receiving super frame non-active period.

2. The method of claim 1, wherein the receiving super frame active period, if the network address included in the region of the beacon frame is the same as the network address of the coordinator, is greater than the receiving super frame active period if the network address included in the region of the beacon frame is not the same as the network address of the coordinator.

3. The method of claim 2, wherein the network address included in the beacon frame is included in a pending address region of the beacon frame.

4. A method of increasing operation time in an IEEE802.15.4-2006 beacon based WSN, the method comprising:
   initializing a maximum receiving standby time to receive data from a lower child coordinator;
   maintaining a transmission super frame active period to receive the data from the lower child coordinator; and
   if the data is received from the lower child coordinator, receiving the data and reinitializing the maximum receiving standby time, and, if the data is not received from the lower child coordinator and a data receiving standby time exceeds the maximum receiving standby time, changing the transmission super frame active period to a transmission super frame non-active period.

5. The method of claim 4, further comprising: transmitting a beacon frame to the lower child coordinator.

6. The method of claim 4, wherein the initializing of the maximum receiving standby time comprises: determining the maximum receiving standby time according to an equation of $$\text{maximum receiving standby time} = \text{basic back-off duration} * (2^{BE(max)} - 1) \text{ symbols},$$

based on a slotted carrier sense multiple access-collision avoidance (CSMA-CA) algorithm under the IEEE802.15.4 standard, and BE(max) denotes a maximum value of a back-off exponent.

7. The method of claim 5, wherein a network address of the lower child coordinator is included in a region of the beacon frame.

8. An apparatus for increasing operation time in an IEEE802.15.4-2006 beacon based WSN, the apparatus comprising:
   a receiving unit determining whether to receive data from an upper parent coordinator based on a result obtained by comparing a network address included in a region of a beacon frame received from the upper parent coordinator with a network address of a coordinator, and changing from a receiving super frame active period to a receiving super frame non-active period after receiving the data; and
   a transmitting unit initializing a maximum receiving standby time if the data is received from a lower child coordinator, maintaining a transmission super frame active period, and, if the data is not received from the lower child coordinator and a data receiving standby time exceeds the maximum receiving standby time, changing the transmission super frame active period to a transmission super frame non-active period.

9. The method of claim 8, wherein the receiving unit comprises:
   a beacon frame receiving unit receiving a beacon frame from the upper parent coordinator;
   a network address comparing unit comparing the network address included in the region of the beacon frame with the network address of the coordinator; and
   a mode changing unit, if the network address included in the region of the beacon frame is the same as the network address of the coordinator, changing the receiving super frame active period to the receiving super frame non-active period after the coordinator receives the data from the upper parent coordinator during the receiving super frame active period, and, if the network address included in the region of the beacon frame is not the same as the network address of the coordinator, changing the receiving super frame active period to the receiving super frame non-active period, and the coordinator not receiving the data from the upper parent coordinator during the receiving super frame active period.

10. The method of claim 8, wherein the transmitting unit comprises:
   a maximum receiving standby time initializing unit initializing the maximum receiving standby time to receive the data from the lower child coordinator;
   a data receiving unit maintaining the transmission super frame active period during the maximum receiving standby time and receiving the data from the lower child coordinator during the transmission super frame active period; and
   a mode changing unit reinitializing the maximum receiving standby time if the data is received from the lower child coordinator, and, if the data is not received from the lower child coordinator and the data receiving standby time exceeds the maximum receiving standby time, changing the transmission super frame active period to the transmission super frame non-active period.

11. The method of claim 9, wherein the receiving super frame active period, if the network address included in the region of the beacon frame is the same as the network address of the coordinator, is greater than the receiving super frame active period if the network address included in the region of the beacon frame is not the same as the network address of the coordinator.

12. The method of claim 9, wherein the network address included in the beacon frame is included in a pending address region of the beacon frame.

13. The method of claim 10, further comprising: a beacon frame transmitting unit transmitting a beacon frame to the lower child coordinator.

14. The method of claim 10, wherein the maximum receiving standby time initializing unit determines the maximum receiving standby time according to an equation of $$\text{maximum receiving standby time} = \text{basic back-off duration} * (2^{BE(max)} - 1) \text{ symbols,}$$

based on a slotted CSMA-CA algorithm under the IEEE802.15.4 standard, and BE(max) denotes a maximum value of a back-off exponent.

15. The method of claim 13, wherein a network address of the lower child coordinator is included in a region of the beacon frame.

16. A non-transitory computer readable recording medium storing a program for executing a super frame in an IEEE802.15.4-2006 beacon based WSN, wherein the super frame comprises:
a receiving beacon frame period receiving a beacon frame from an upper parent coordinator;
a receiving super frame active period determining whether to receive data from the upper parent coordinator based on a result obtained by comparing a network address included in a region of the beacon frame with a network address of a coordinator, and adjusting duration of an operation period of the coordinator according to an amount of the data;
a receiving super frame non-active period completely receiving the data and maintaining power consumption of the coordinator as a standby state;
a transmitting beacon frame period transmitting the beacon frame to a lower child coordinator;
a transmitting super frame active period maintaining the operation state of the coordinator during a maximum receiving standby time to receive the data from the lower child coordinator; and
a transmitting super frame non-active period maintaining the power consumption of the coordinator as the standby state,
wherein maximum receiving standby time initializing unit determines the maximum receiving standby time according to an equation of $$\text{maximum receiving standby time} = \text{basic back-off duration} * (2^{BE(max)} - 1) \text{ symbols,}$$

based on a slotted CSMA-CA algorithm under the IEEE802.15.4 standard, and BE(max) denotes a maximum value of a back-off exponent.

17. The computer readable recording medium of claim 16, wherein the duration of the receiving beacon frame period, the receiving super frame active period, and the receiving super frame non-active period is the same as a super frame duration (SD),
wherein SD=basic SD*$2^{SO}$ symbols, the SO is greater than or equal to 0 and is smaller than or equal to the BO, and BO is greater than or equal to 0 and is smaller than or equal to 14.

18. The computer readable recording medium of claim 16, wherein the duration of the transmitting beacon frame period, the transmitting super frame active period, and the transmitting super frame non-active period is the same as the SD,
wherein SD=basic SD*$2^{SO}$ symbols, the SO is greater than or equal to 0 and is smaller than or equal to the BO, and BO is greater than or equal to 0 and is smaller than or equal to 14.

19. The computer readable recording medium of claim 16, further comprising: a non-active period in which no data is received from the upper parent coordinator or from the lower child coordinator.

* * * * *